US012451572B2

(12) United States Patent
Da Silveira et al.

(10) Patent No.: US 12,451,572 B2
(45) Date of Patent: Oct. 21, 2025

(54) SLIDING PHASE SHIFTER INCLUDING FIXED AND SLIDING SUBSTRATES HAVING STRIPLINES THEREON THAT ARE SLIDABLY COUPLED, WHEREIN VIAS SURROUND A PERIMETER OF THE SLIDING SUBSTRATE

(71) Applicant: Telefonaktiebolaget LM Ericsson (publ), Stockholm (SE)

(72) Inventors: Marthinus Da Silveira, Ottawa (CA); Neil McGowan, Stittsville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 215 days.

(21) Appl. No.: 18/006,024

(22) PCT Filed: Jul. 24, 2020

(86) PCT No.: PCT/IB2020/057039

§ 371 (c)(1),
(2) Date: Jan. 19, 2023

(87) PCT Pub. No.: WO2022/018506

PCT Pub. Date: Jan. 27, 2022

(65) Prior Publication Data

US 2024/0014533 A1 Jan. 11, 2024

(51) Int. Cl.

| | |
|---|---|
| ***H01P 1/18*** | (2006.01) |
| ***H01Q 1/24*** | (2006.01) |
| ***H01Q 3/32*** | (2006.01) |

(52) U.S. Cl.

CPC ............. *H01P 1/184* (2013.01); *H01Q 1/246* (2013.01); *H01Q 3/32* (2013.01)

(58) Field of Classification Search

CPC ....................................................... H01P 1/184

(Continued)

(56) References Cited

U.S. PATENT DOCUMENTS 7,224,246 B2 * 5/2007 Thomas .................. H01Q 3/32 333/159

2003/0016097 A1 * 1/2003 McKinzie, III et al. .................... H01Q 3/2682 333/161

(Continued)

FOREIGN PATENT DOCUMENTS

| | | |
|---|---|---|
| CN | 110867630 A | 3/2020 |
| JP | WO2017/208382 A1 | 12/2017 |

OTHER PUBLICATIONS

International Search Report and Written Opinion dated Apr. 16, 2021 issued in PCT Application No. PCT/IB2020/057039, consisting of 14 pages.

*Primary Examiner* — Benny T Lee

(74) *Attorney, Agent, or Firm* — Sonoda & Kobayashi Intellectual Property Law; Sarvajit S. Patil

(57) ABSTRACT

Sliding phase shifters for use in phased array antennas are disclosed. According to one aspect, a sliding phase shifter includes a fixed dielectric having first striplines to couple power into the sliding phase shifter. The sliding phase shifter also includes a sliding dielectric having second striplines electrically slidingly coupled to the first striplines. An amount of phase shift is determined by an amount of overlap of the first striplines and the second striplines, a width of the second striplines being at least partially tapered along a portion of the second striplines to improve performance.

16 Claims, 13 Drawing Sheets

(58) Field of Classification Search
USPC .......................................................... 333/161
See application file for complete search history.

(56) References Cited

U.S. PATENT DOCUMENTS

| | | | |
|---|---|---|---|
| 2010/0073105 A1 | 3/2010 | Chang et al. | |
| 2011/0140805 A1* | 6/2011 | Liu et al. ................ | H01P 1/184 333/161 |
| 2017/0117601 A1 | 4/2017 | Lindmark | |

* cited by examiner

--PRIOR ART--

--PRIOR ART--

--PRIOR ART--

SLIDING PHASE SHIFTER INCLUDING FIXED AND SLIDING SUBSTRATES HAVING STRIPLINES THEREON THAT ARE SLIDABLY COUPLED, WHEREIN VIAS SURROUND A PERIMETER OF THE SLIDING SUBSTRATE

CROSS-REFERENCE TO RELATED APPLICATION

This application is a Submission Under 35 U.S.C. § 371 for U.S. National Stage Patent Application of International Application Number: PCT/IB2020/057039, filed Jul. 24, 2020 entitled "STRIPLINE PHASE SHIFTER," the entirety of which is incorporated herein by reference.

TECHNICAL FIELD

Wireless communication and in particular to high performance stripline phase shifters in a radio frequency (RF) front end.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs.

Referring to FIG. 1, in order to communicate with multiple WDs 8*a*, 8*b*, 8*c* (referred to collectively as WDs 8) in different spatial directions, the network node may be equipped with an RF front end having a phased array antenna 12 with antenna elements 14, phase shifters 16 and a beamformer 18. The beamformer 18 determines for each phase shifter 16 an amount of phase shift to be introduced by the phase shifter 16 in the path toward an antenna element 14. By selecting and implementing the phase shift in each path, a beam of the phased array antenna 12 can be steered toward one or more specific directions toward different WDs 8. For example, the phase shifters 16 can cause the beam to steer toward a particular elevation direction.

The phase shifters 16 can be adjusted to achieve different phases by varying a wiper arm 20 in a wiper arm configuration, as shown in FIG. 2, or by varying an overlap of striplines, as shown in FIG. 3. In FIG. 3, two parallel striplines 22*a* and 22*b* are overlapped by a U-shaped stripline 24. Phase is adjusted by moving the U-shaped stripline 24 to the left or right in FIG. 3. When stripline 24 is moved to the left, there is more overlap and less phase shift, whereas when stripline 24 is moved to the right, there is less overlap and more phase shift. This is sometimes referred to as a trombone phase shifter. A disadvantage of the configuration of FIG. 2 is large return loss, whereas a disadvantage of the configuration of FIG. 3 is a need for shielding, which uses greater volume and increased weight.

SUMMARY

Some embodiments advantageously provide a method and system for high performance stripline phase shifters in a radio frequency (RF) front end. In some embodiments, a trombone-type stripline is provided with shielding by vias and an upper ground plane. Such shielding is lighter and smaller in volume than known shielding. In some embodiments, the sliding portion of the stripline phase shifter is tapered to provide return loss over the phase shift range that is improved over known methods. In some embodiments, the sliding portion of the sliding phase shifter and/or the fixed portion of the sliding phase shifter are tapered in the direction of motion to provide performance in the presence of mechanical misalignment that is improved over known methods. In particular, in some embodiments, the fixed portion is wider than the sliding portion to provide improved performance in the presence of mechanical misalignment between the fixed portion and the sliding portion as compared with using fixed and sliding portions having the same width. In some embodiments, a non-linear stripline is used to achieve greater phase shift per unit of motion of the sliding portion of the sliding phase shifter. In some embodiments, a sliding dielectric portion overlaps a fixed portion to achieve a desired phase shift.

According to one aspect, a sliding phase shifter includes a fixed dielectric having first striplines to couple power into the sliding phase shifter. The sliding phase shifter also includes a sliding dielectric having second striplines electrically slidingly coupled to the first striplines, an amount of phase shift of a signal being determine by an amount of overlap of the first striplines and the second striplines, a width of the second striplines being at least partially tapered along a portion of the second striplines.

According to this aspect, in some embodiments, the sliding dielectric has a first ground plane on at least part of one side of the sliding dielectric and has the second striplines on an opposite side of the sliding dielectric facing the fixed dielectric, and wherein the sliding dielectric further comprises vias extending from the one side to the opposite side of the sliding dielectric, the vias encompassing at least a portion of a perimeter surrounding the first and second striplines. In some embodiments, the sliding phase shifter further includes a second ground plane below at least a portion of the second striplines, a separation between the first ground plane and the second ground plane being selected to achieve an impedance of the second striplines that matches an impedance of the first striplines. In some embodiments, the second ground plane is limited in extent so as to expose at least a portion of the first striplines to the first ground plane. In some embodiments, the separation is selected so that a return loss is below a threshold for all positions of the sliding dielectric within a frequency band of operation. In some embodiments, the sliding phase shifter further includes a ground coupling strip along the perimeter, the ground coupling strip terminating one end of the vias. In some embodiments, the second striplines are narrower than the first striplines. In some embodiments, the taper is selected to achieve an insertion loss that is above a threshold for all positions of the sliding dielectric within a frequency band of operation. In some embodiments, the first striplines are at least partially tapered in width along a direction of propagation of the first striplines. In some embodiments, the taper is linear.

According to another aspect, a sliding phase shifter includes a fixed dielectric structure having first striplines. The sliding phase shifter also includes a sliding dielectric structure. The sliding phase shifter is configured to provide a change in phase shift of a signal when the sliding dielectric structure slides over the first striplines to change an amount of overlap of the sliding dielectric and the first striplines. The sliding dielectric structure has a first region with a first ground plane above a level of the first striplines and having a second region with a dielectric slab above the level of the first striplines and below a second ground plane.

According to this aspect, in some embodiments, the first striplines follow a curved path. In some embodiments, the curved path is sinusoidal. In some embodiments, the first ground plane is separated from the first striplines by air. In some embodiments, the dielectric slab is configured to cover an entire length of the first striplines in a minimum delay position. In some embodiments, a dielectric constant of the dielectric slab is higher than a dielectric constant of a dielectric of the fixed dielectric structure. In some embodiments, the fixed dielectric structure has a third ground plane below the first striplines and a signal trace in a same plane as the third ground plane, the signal trace being coupled to the first striplines by a via. In some embodiments, a height of the first ground plane, a height of the second ground plane and a height of the third ground plane are selected to provide an insertion loss that exceeds a threshold in a frequency band of operation. In some embodiments, a height of the first ground plane, a height of the second ground plane and a height of the third ground plane are selected to provide a return loss that falls below a threshold in a frequency band of operation. In some embodiments, the second ground plane is above the first region and the second region, a ground coupling strip surrounds a perimeter of the sliding dielectric structure and a plurality of vias around the perimeter, the vias extending from the ground coupling strip to the second ground plane.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
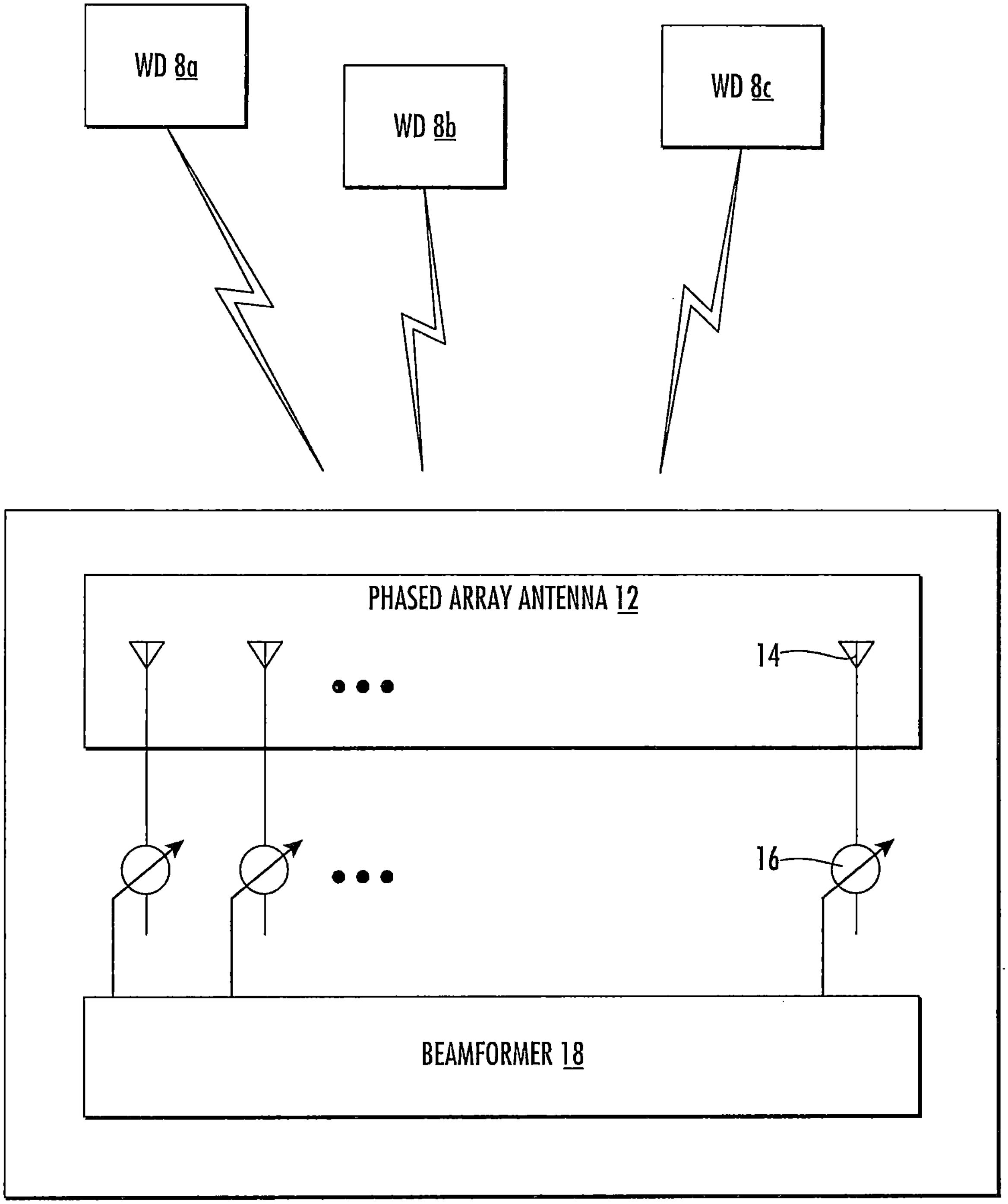
FIG. 1 is a block diagram of a network node showing a portion of an RF front end.
Figure 2:
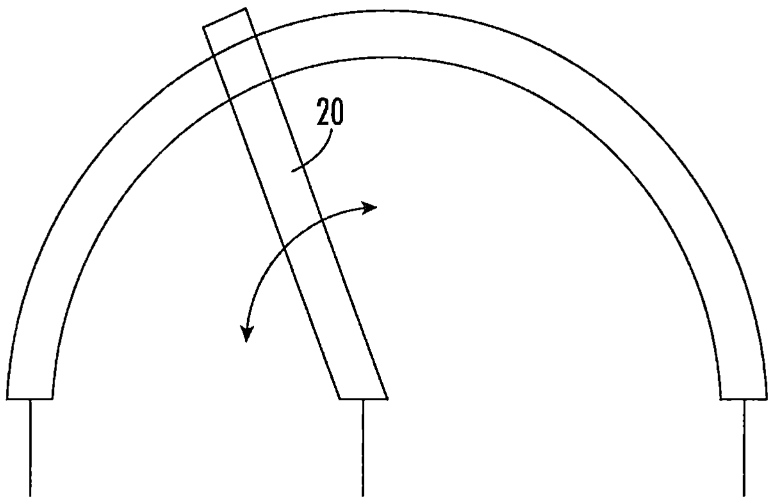
FIG. 2 illustrates a wiper arm phase shifter.
Figure 3:
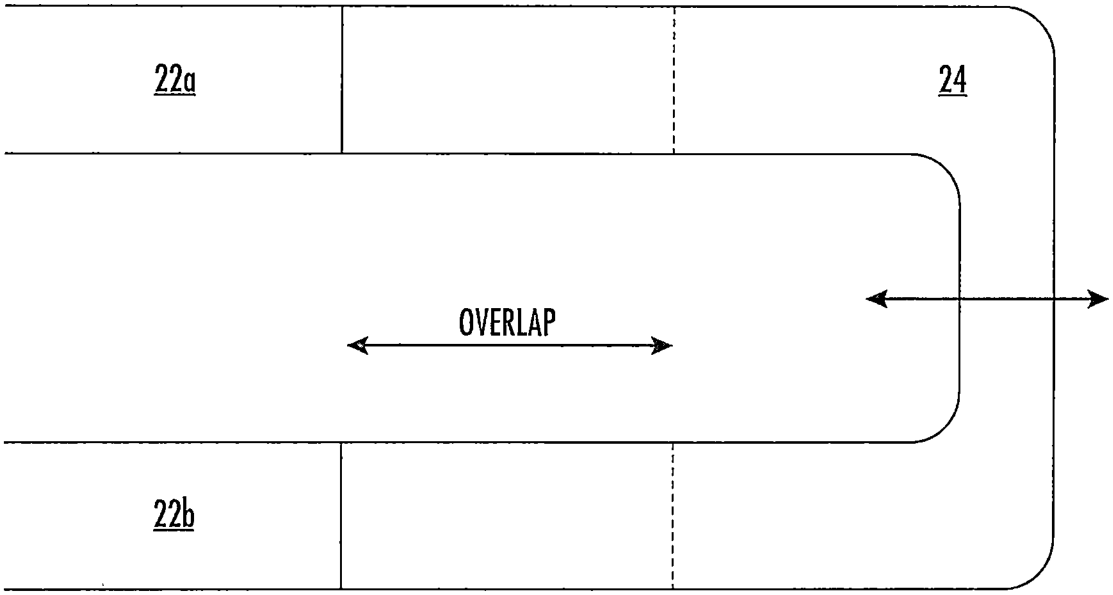
FIG. 3 illustrates a trombone phase shifter configuration.

Before describing in detail exemplary embodiments, it is noted that the embodiments reside primarily in combinations of apparatus components and processing steps related to high performance stripline phase shifters in a radio frequency (RF) front end. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," "above," "below" and the like, may be used solely to distinguish one entity or element from another entity or element without necessarily requiring or implying any physical or logical relationship or order between such entities or elements.

Figure 4:
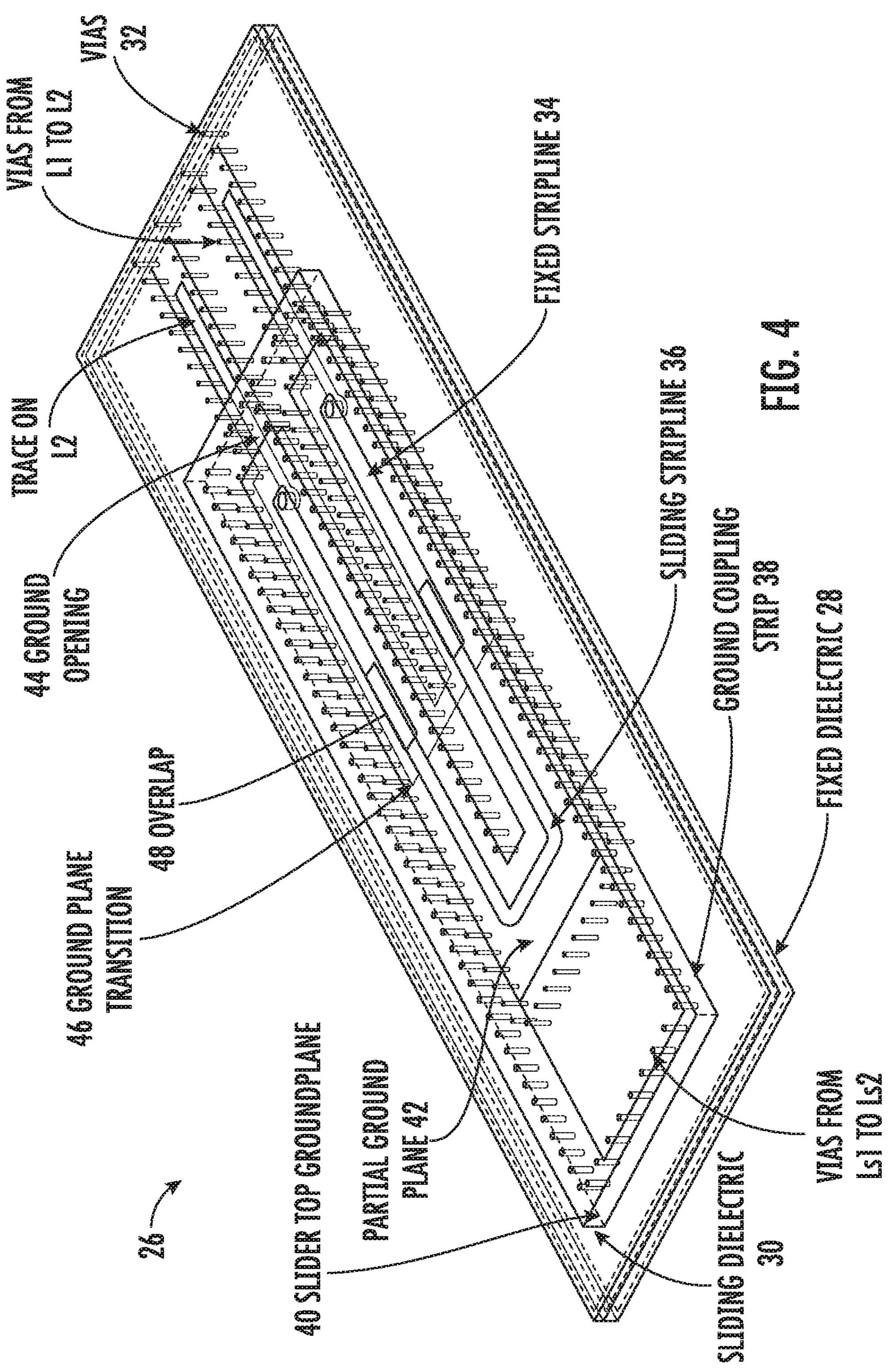
FIG. 4 is a perspective view of an embodiment of a sliding phase shifter according to principles set forth herein.

Returning to the drawing figures, where like reference designators refer to like elements, FIG. 4 shows a perspective view of one embodiment of a sliding phase shifter 26 according to principles set forth herein. The sliding phase shifter 26 has a fixed dielectric 28, over which is situated a sliding dielectric 30. Vias 32 form a circumferential pattern around the perimeter of a fixed stripline 34 and a sliding stripline 36. Vias 32 are also positioned in the center region in the area between sliding stripline 36 and fixed striplines 34. At one end, e.g., a bottom, of the vias 32 is a ground coupling strip 38 and at the opposite end, e.g., a top, of the vias 32 is a top ground plane 40. The ground coupling strip 38 is positioned around the perimeter of the fixed stripline 34 and sliding stripline 36. The vias 32 extend from the ground coupling strip 38 to the top ground plane 40.

The combination of the vias 32, the ground coupling strip 38 and top ground plane 40 forms a shield around the fixed stripline 34 and sliding stripline 36 of the sliding phase shifter 26. A partial ground plane 42 is under a portion of the sliding stripline 36. The partial ground plane 42 has an opening 44 exposing the fixed stripline 34, forming a ground plane transition 46. FIG. 4 shows the sliding stripline 36 overlapping at 48 the fixed stripline 34. FIG. 4 also shows the trace on L2, vias L1 to L2 and vias from Ls1 to Ls2.

Figure 5:
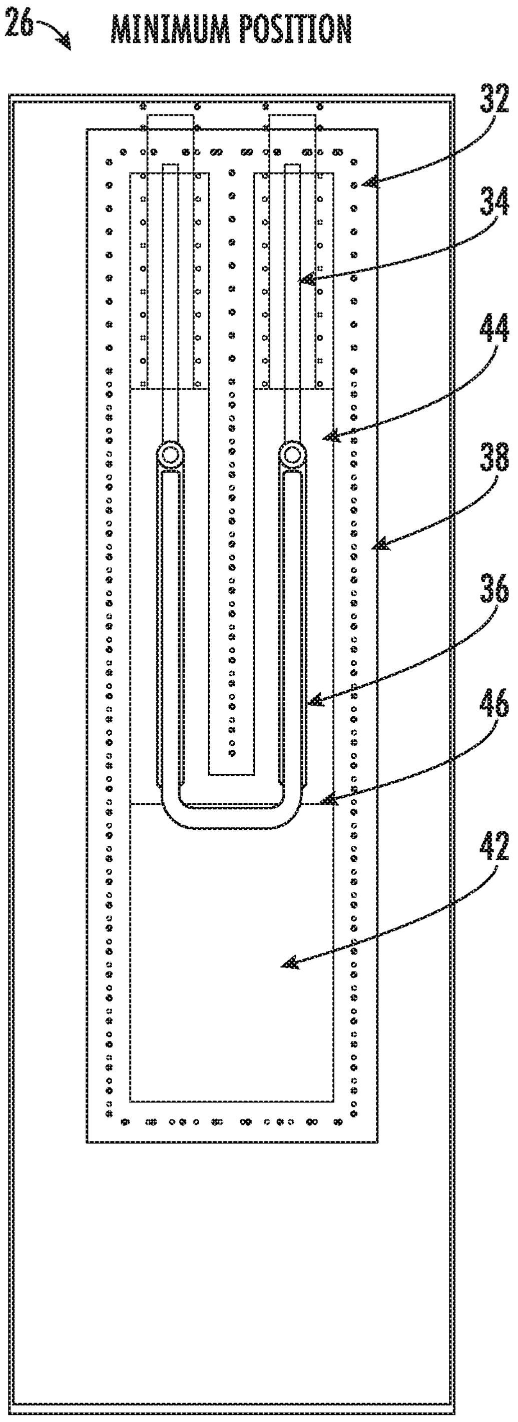
FIG. 5 is top view of an embodiment of a sliding phase shifter in a position of minimum phase shift.
Figure 6:
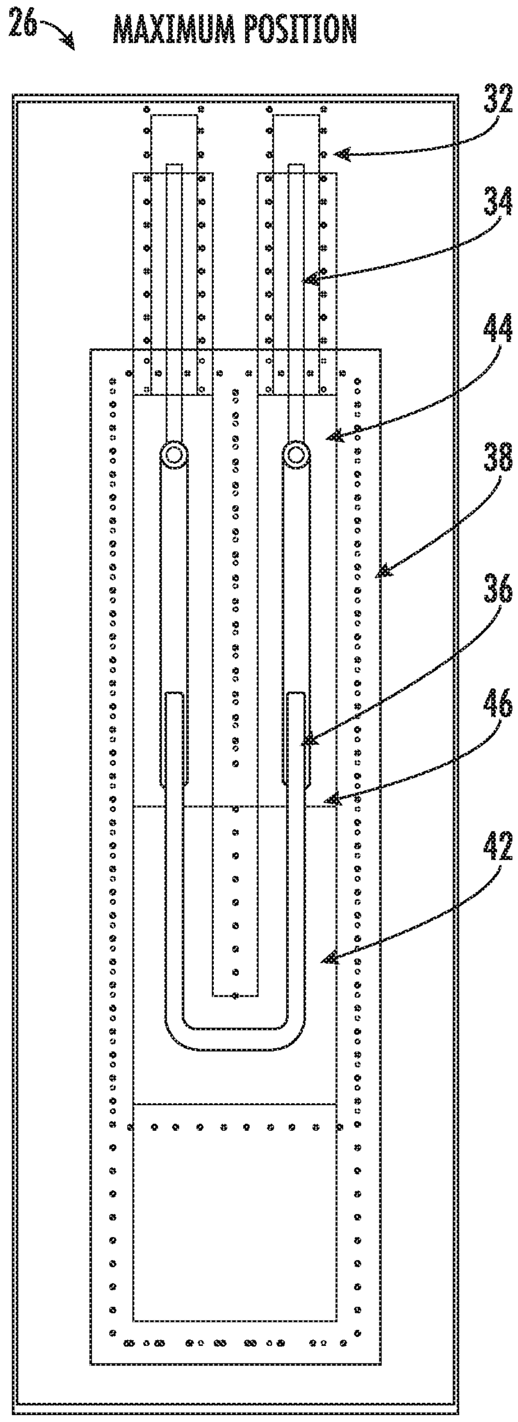
FIG. 6 is a top view of an embodiment of a sliding phase shifter in a position of maximum phase shift.

FIGS. 5 and 6 show two top views of the sliding phase shifter 26. FIG. 5 shows the sliding phase shifter 26 with the sliding stripline 36 being in a minimum delay position with respect to the fixed stripline 34 to provide minimum phase shift. FIG. 6 shows the sliding phase shifter 26 with the sliding stripline 36 in a maximum delay position with respect to the fixed stripline 34 to provide maximum phase shift. Minimum and maximum used herein refer to the minimum and maximum with respect to the functional extremes, i.e., phase shift, achievable with the particular structure.

Figure 7:
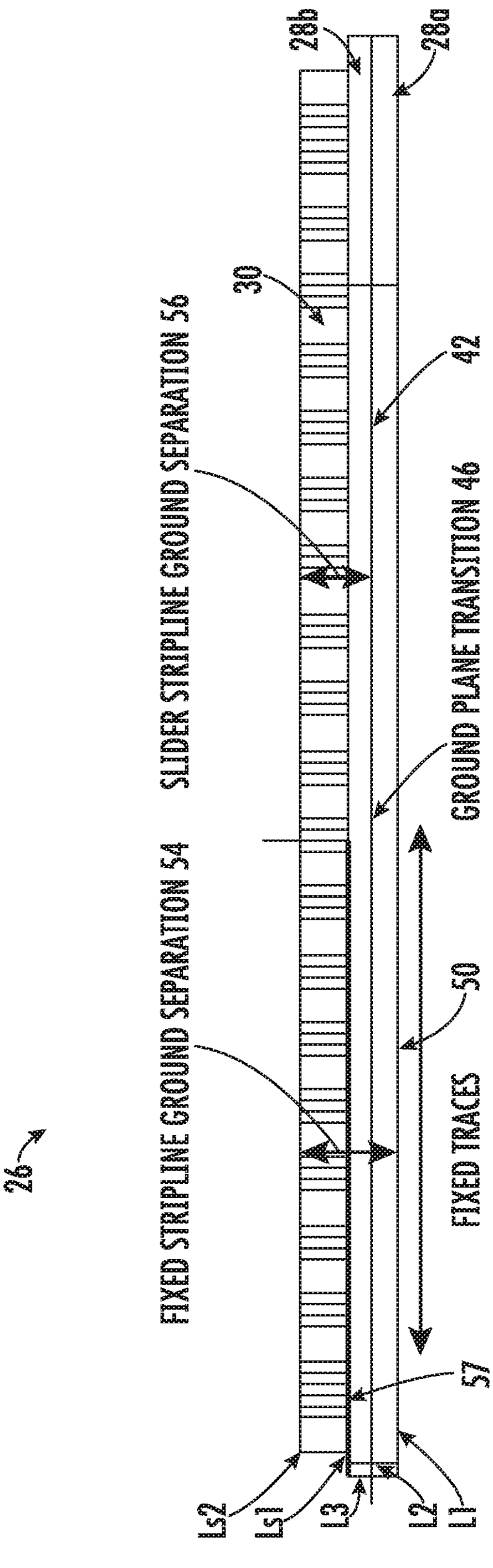
FIG. 7 is a side view of an embodiment of a sliding phase shifter according to principles set forth herein.

FIG. 7 shows a side view of the sliding phase shifter 26. The sliding dielectric 30 exhibits surface Ls1 and surface Ls2. Surface Ls1 carries the ground coupling strip 38. Surface Ls2 carries the top ground plane 40. The fixed dielectric 28 includes a lower portion 28*a* and an upper portion 28*b*. The lower portion 28*a* includes surface L1, which has a ground plane 50. The fixed dielectric 28 may be part of a printed circuit board (PCB) that has the fixed dielectric 28. The lower portion 28*a* also includes surface L2 which is not metallized to the left of the ground plane transition 46 and is metallized to form a partial ground plane 42 to the right of the ground plane transition 46. The fixed stripline 34 ground separation, which is the separation between L1 and Ls2, may be designed so that the fixed stripline 34 exhibits a first impedance. The partial ground plane 42, is closer to the top ground plane 40 and creates a sliding stripline 36 ground separation 56, which is the separation between L2 and Ls2, that exhibits a second impedance. A width and taper of the sliding stripline 36, as well as the height of the partial ground plane 42 and ground separation 54, may be designed so that the second impedance closely matches the first impedance, in order to reduce reflection by the sliding phase shifter 26. Note that FIG. 7 shows only the vias 32 in the sliding dielectric part 30. In some embodiments, there may also be vias 32 that extend from the lower ground plane 50 to the upper most level L3 of the fixed dielectric 28. There may also be vias that connect the fixed stripline 34 to signal traces on another level that carry a signal into the sliding phase shifter 26. A thin dielectric layer 57, such as a solder mask or Teflon®, may lie between layers Ls1 and L3 to reduce passive intermodulation (PIM) and to reduce friction. In FIG. 7, fixed traces may be positioned in proximity to the lower ground plane 50.

Figure 8:
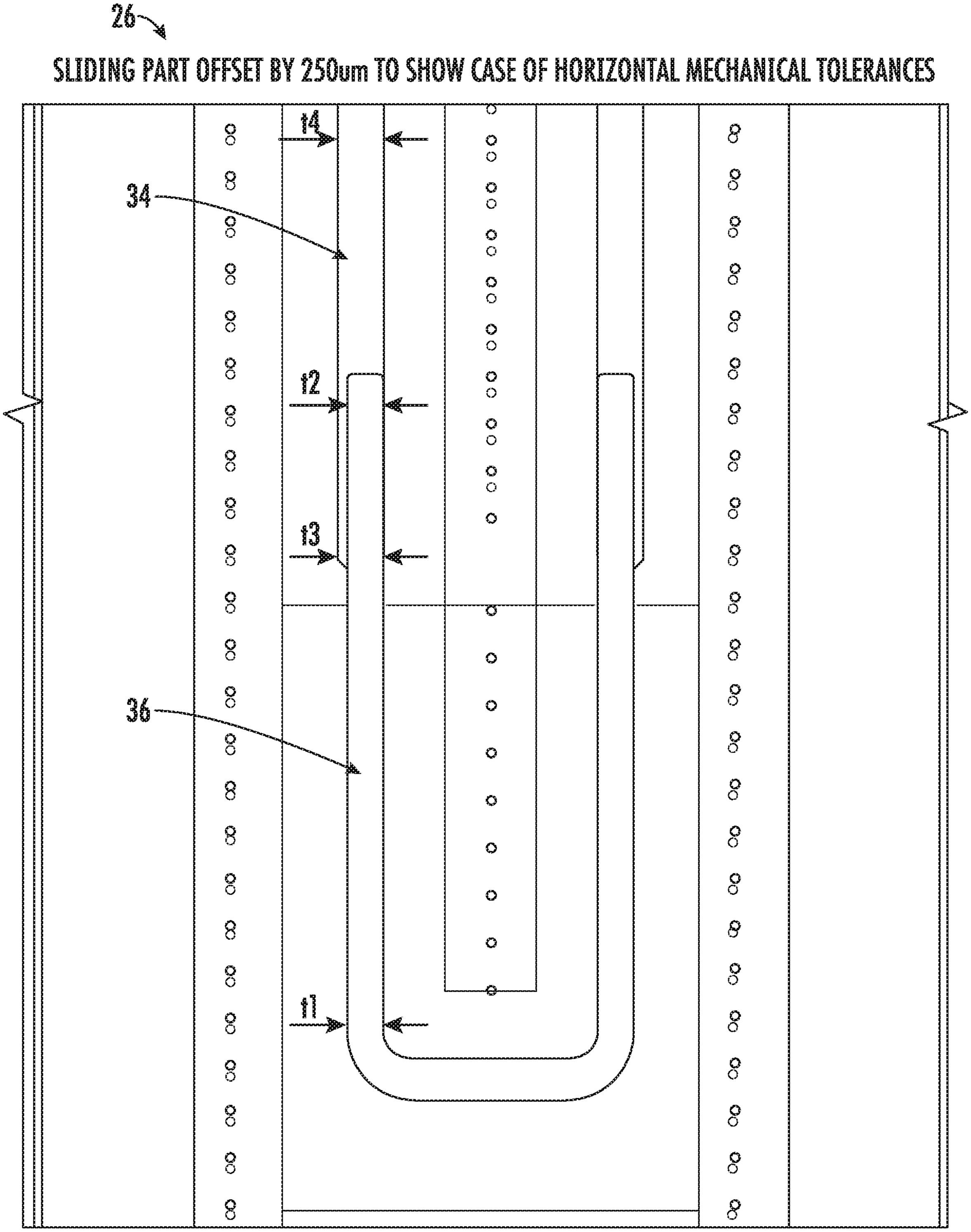
FIG. 8 is a top view of an embodiment of a sliding phase shifter with striplines of a sliding part being narrower than striplines of a fixed part.

FIG. 8 shows a case of horizontal mechanical tolerance. FIG. 8 shows a top view of the sliding phase shifter 26 where at a base of the sliding stripline 36, the width of the sliding stripline 36 is a first value t1. At an end of the sliding stripline 36, the width of the sliding stripline 36 is a second value t2, which is less than the first value t1. In some embodiments, t1=1.35 mm and t2=1.15 mm. In some embodiments, the fixed stripline may also be tapered, with a narrow end having width t3 and a wider base width t4. In some embodiments, t3=1.836 mm and t4=2 mm. In FIG. 8, the sliding stripline 36 is shifted to the right by, for example, 250 um. This illustrates that when the sliding stripline 36 is narrower than the fixed stripline 34, the fixed stripline 34 encompasses the sliding stripline 36 when there is side-to-side motion within design tolerances. By ensuring overlap of the fixed stripline 34 and the sliding stripline 36, better phase shifter performance, as indicated by return loss, insertion loss or delay linearity, can be achieved than the performance that can be achieved, if there is any non-overlap.

As a consequence of making t2 less than t3, the impedance of the sliding stripline 36 would differ substantially from the impedance of the fixed stripline 34, but for the positioning of the partial ground plane 42 to match these impedances.

Figure 9:
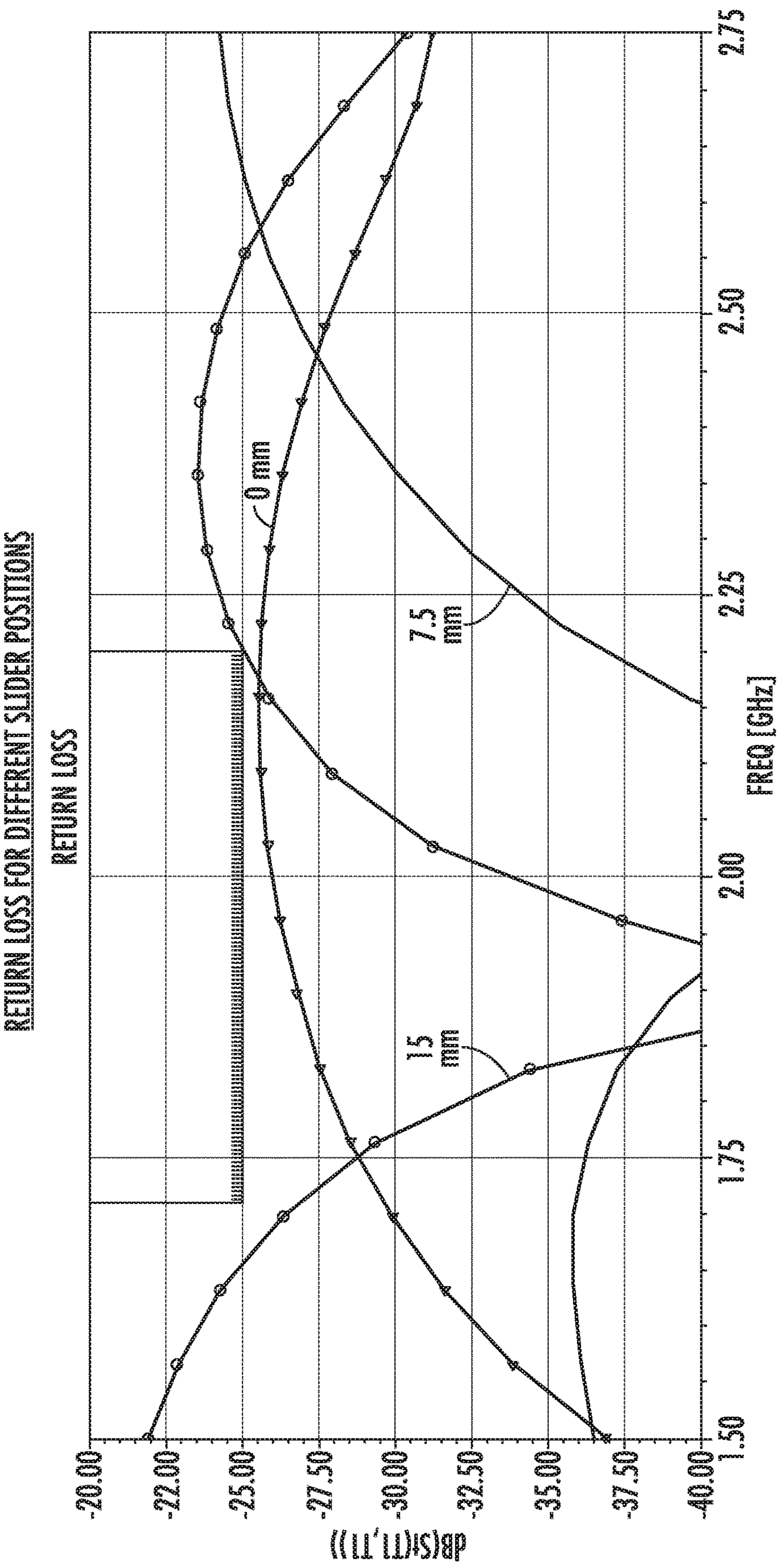
FIG. 9 is a graph of return loss versus frequency for different positions of the sliding part of a sliding phase shifter.
Figure 10:
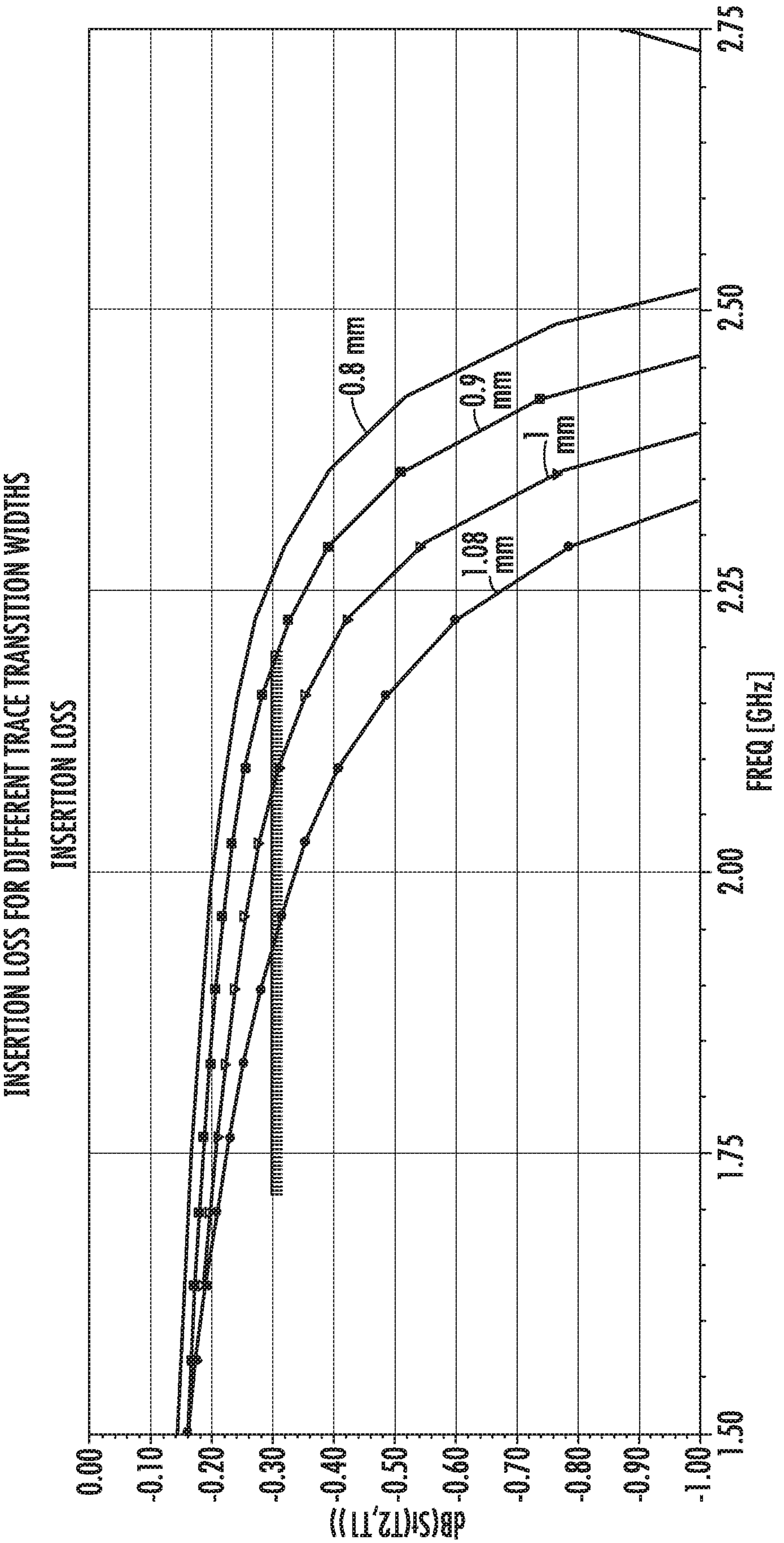
FIG. 10 is a graph of insertion loss versus frequency for different transition widths.

FIG. 9 is a graph of return loss versus frequency for three different positions of the sliding stripline 36, where 0 mm indicates the minimum delay position of the sliding stripline 36 shown in FIG. 5. FIG. 10 is a graph of insertion loss versus frequency for 4 different trace transition widths with the sliding stripline in the minimum delay position As shown in FIG. 8, by tapering the width of the sliding stripline 36 from t1 to t2, and/or tapering the width of the fixed stripline 34 from t3 to t4, undesired nulls or a large increase in the insertion loss over an operating frequency band can be avoided.

Figure 11:
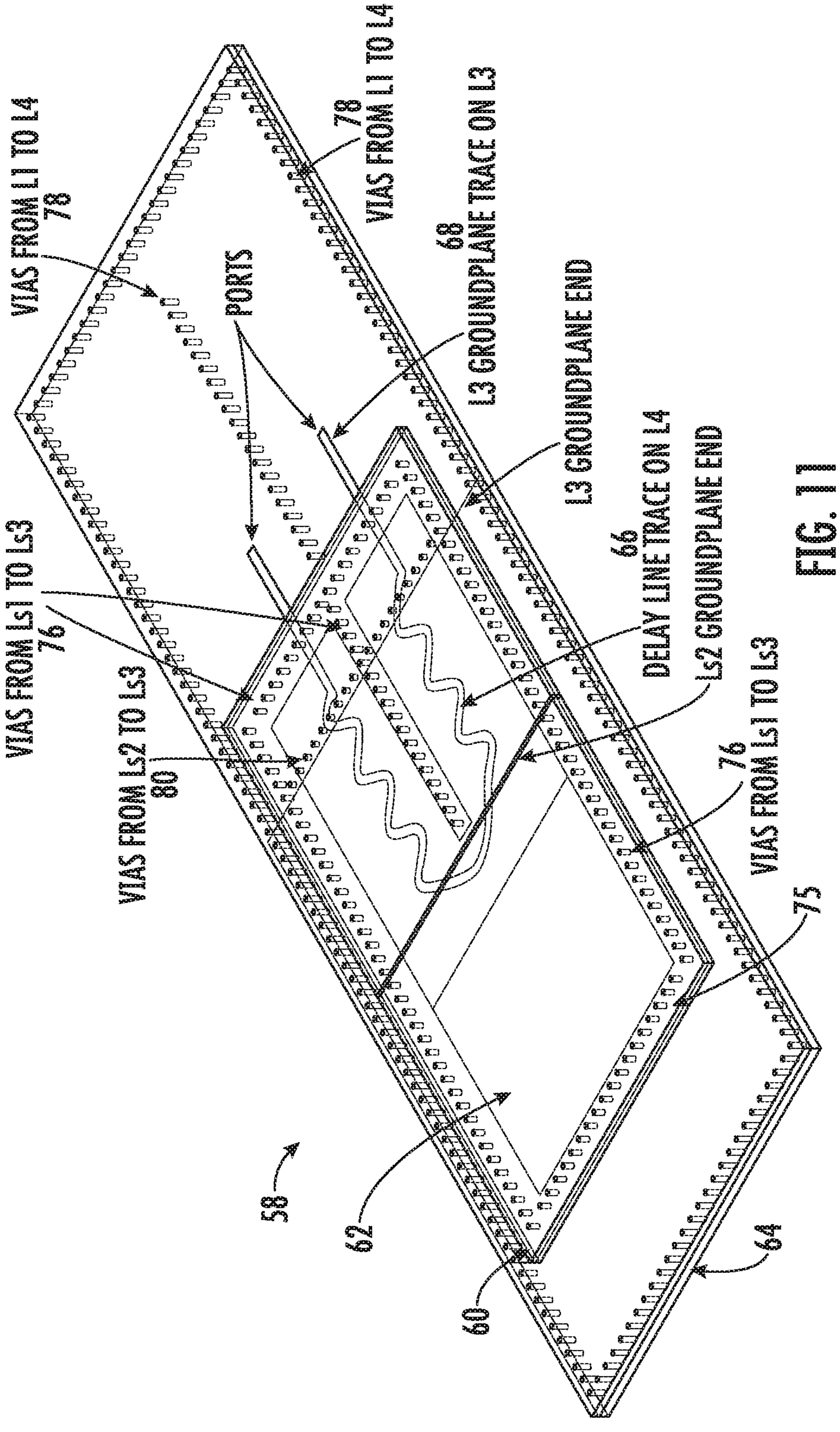
FIG. 11 is a perspective view of another embodiment of a sliding phase shifter according to principles set forth herein.
Figure 12:
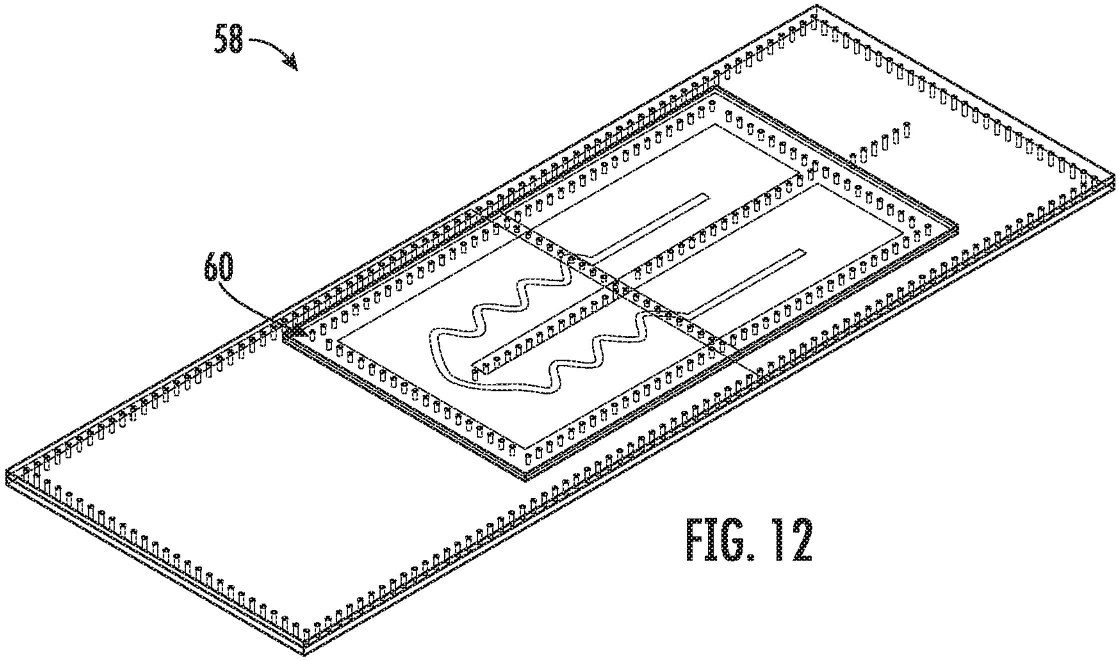
FIG. 12 is a perspective view of a sliding phase shifter in a minimum delay position.

FIG. 11 shows a perspective view of another embodiment of sliding phase shifter 58. The sliding phase shifter 58 has a sliding dielectric structure 60 that has an Ls2 ground plane 62. A fixed dielectric structure 64 has a stripline 66 (delay line trace) on a level L4. The stripline 66 is shown in FIG. 11 as a pair of physically parallel sine waves, with one side of the stripline 66 being in the shape of a sine wave and the opposite side of the stripline 66 being in the shape of a cosine wave. Although the stripline 66 is non-linear, because of its symmetry, the stripline 66 provides a linear change in phase shift when the sliding portion is moved relative to the fixed portion. Other non-linear traces can be employed. An advantage of the non-linear stripline 66 is that more phase change per unit of movement of the sliding dielectric structure 60 can be achieved. A pair of straight traces 68 on another level L3 provides an interface with an external circuit. In operation, as the sliding dielectric structure 60 moves from a maximum delay position, such as shown in FIG. 11, to a minimum delay position as shown in FIG. 12, the phase shift decreases.

Figure 13:
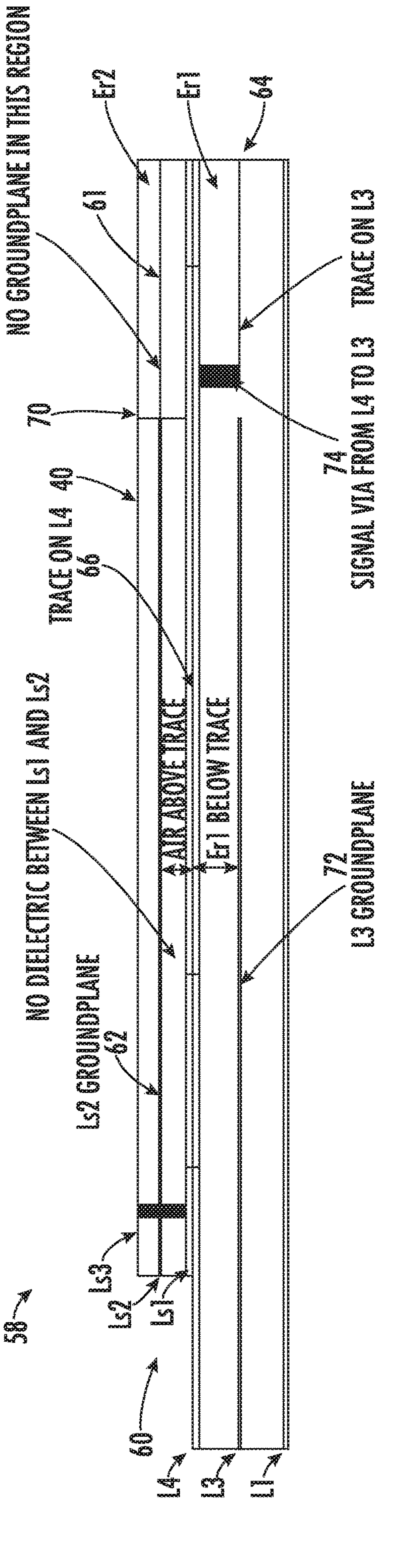
FIG. 13 is a side view of the embodiment shown in FIG. 11 at minimum delay.
Figure 14:
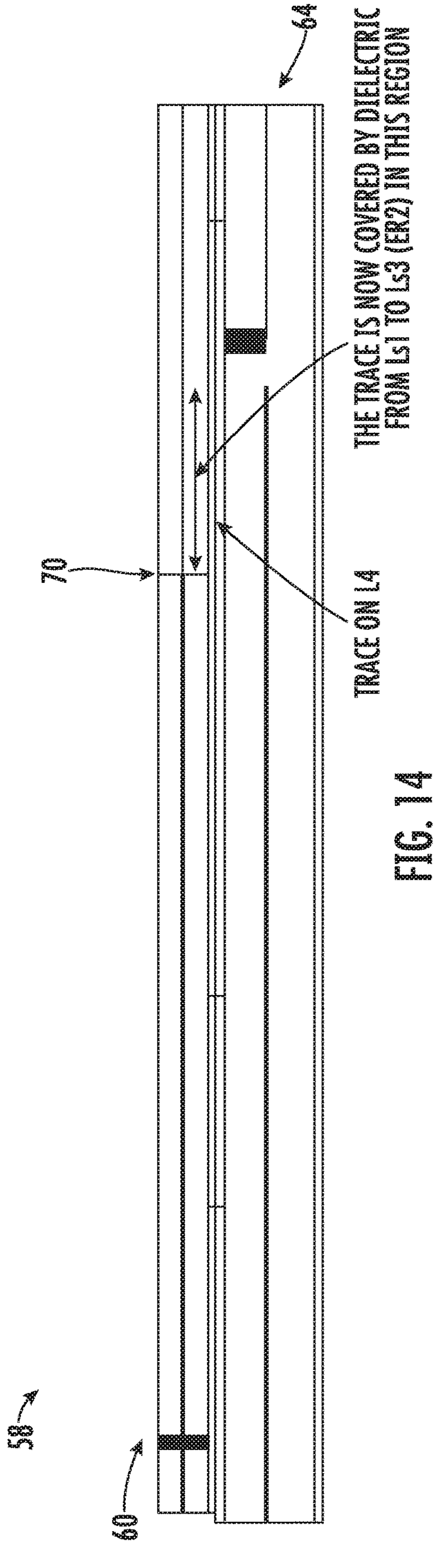
FIG. 14 is another side view of the embodiment shown in FIG. 11 at an intermediate delay.

FIGS. 13 and 14 show a side view of the sliding phase shifter 58. In FIG. 13, the sliding dielectric structure 60 is in a minimum delay position. In FIG. 14, the sliding dielectric structure 60 is in a position of increased delay as compared to the minimum delay position. The sliding dielectric structure 60 has a first region to the left of a transition point 70 and a second region to the right of the transition point 70. In the first region there are two levels of the sliding dielectric structure 60. The upper level has a dielectric which carries on the Ls2 ground plane 62 on the lower surface of the dielectric, as shown in FIG. 13. The lower level may be air. In the second region there is no ground plane on Ls2. Rather, the second region has a dielectric ε2, which may be the same or different from the dielectric el of the fixed dielectric structure 64. The stripline 66 is carried by the upper surface of the fixed dielectric structure 64 on level L4 between the air of the lower level of the first region and the fixed dielectric structure 64. Note that the fixed dielectric structure 64 has an upper dielectric layer that carries the stripline 66 and a lower dielectric structure which carries the L3 ground plane. Also, a signal via 74 couples the traces 68 on level L3 to the stripline 66 on level L4.

When the sliding dielectric structure 60 is in the minimum delay position, as shown in FIG. 13, the stripline 66 has air above it up to level Ls2 and has dielectric below it down to level L3, or another layer (not shown) between L1 and L3. The width of the stripline 66, the distance between level Ls1 and level Ls2, the distance between level L3 and L4, and ε1 all may be determined to achieve a constant impedance (for example, 50 ohms) of the stripline 66. Note that Ls1 is the lower level of the gap between level Ls2 and level L4. As the sliding dielectric structure 60 is moved to the left (which may be as positioned by a stepper motor, for example), the stripline 66 becomes more completely covered by the dielectric ε2. This causes the phase shift (or delay) of the sliding phase shifter 58 to increase. The impedance of the stripline 66 that is covered by dielectric ε2 is now determined by width of the stripline 66, the distance between levels Ls1 and Ls3, the distance between levels L3 and L4 and the dielectrics ε1 and ε2. These parameters may be chosen to achieve an impedance that is constant (or within upper and lower limits of the constant) over the entire range of positions of the sliding dielectric structure 60. An advantage of the sliding phase shifter 58 is reduced sensitivity to side to side motion of the sliding dielectric structure 60. An advantage of the sliding phase shifter 58 is reduced sensitivity to side to side motion of the sliding dielectric structure 60. FIG. 13 also shows no dielectric between Ls1 and Ls2, air above the trace on L3 and ε1 below the trace on L3. FIG. 14 also shows that the trace is covered by dielectric from Ls1 to Ls3 (ε2) in the region shown by the horizontal double arrow.

Returning to FIG. 11, ground coupling strip 75 above level Ls2 forms a shielding box in conjunction with first vias 76 from level Ls1 to a ground plane on level Ls3. Second vias 78 extend from level L1 to level L4. Third vias 80 extend from level Ls2 to level Ls3, where level Ls3 is the upper surface of the sliding dielectric structure 60 and is at least partially metallized to provide shielding. FIG. 11 also shows ports of sliding phase shifter 58, the Ls2 ground plane end, and the L3 ground plane end.

Figure 15:
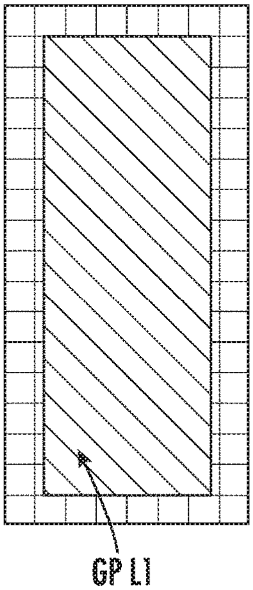
FIGS. 15-22 illustrate top views of various parts in successive layers of an embodiment of a sliding phase shifter shown in FIGS. 11-13.
Figure 16:
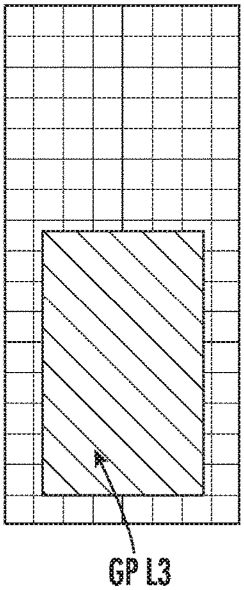
Figure 17:
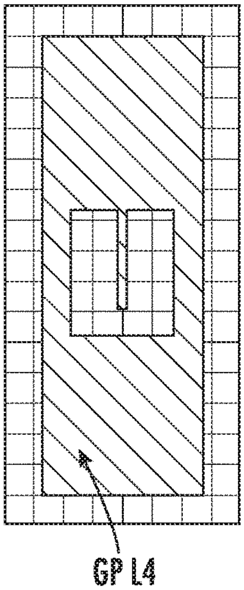
Figure 18:
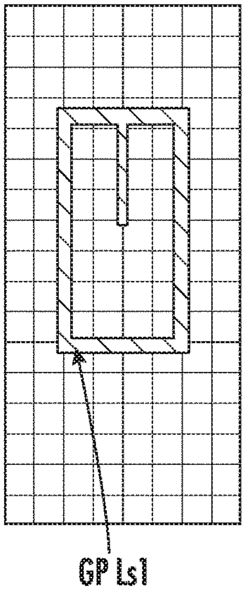
Figure 19:
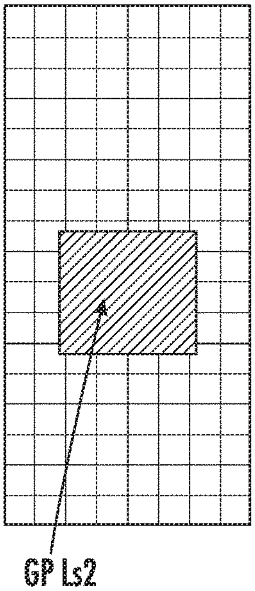
Figure 20:
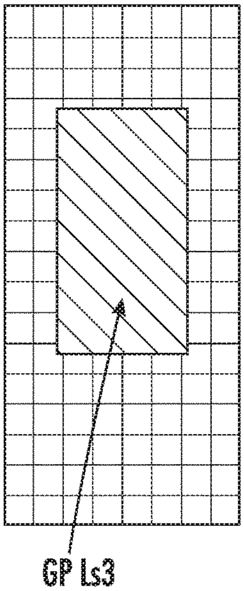
Figure 21:
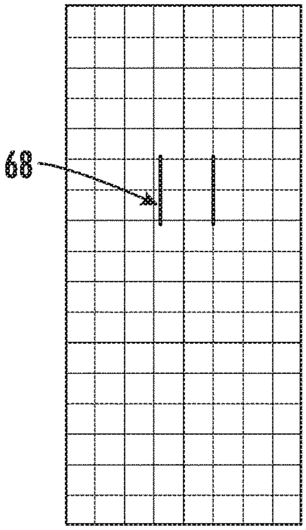
Figure 22:
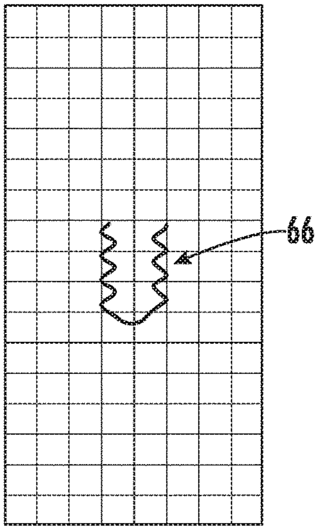

FIGS. 15-22 illustrate various parts of the sliding phase shifter 58 shown in FIGS. 13 and 14, where GP stands for ground plane. In FIGS. 15-20 the outer perimeter of each layer may be the outer boundary of a dielectric on which the indicated ground plane (GP) is carried. FIG. 15 illustrates an example of the L1 ground plane. FIG. 16 illustrates an example of the ground plane on L3. FIG. 17 illustrates an example of the L4 ground plane. FIG. 18 illustrates an example of the Ls1 ground plane. FIG. 19 illustrates an example of the Ls2 ground plane. FIG. 20 illustrates an example of the Ls3 ground plane. FIG. 21 shows an example of the traces 68 and FIG. 22 shows an example of the stripline 66.

Thus, according to one aspect, a sliding phase shifter 26 includes a fixed dielectric 28 having first striplines 34 to couple power into the sliding phase shifter 26. The sliding phase shifter 26 also includes a sliding dielectric 30 having second striplines 36 electrically slidingly coupled to the first striplines 34, an amount of phase shift or delay of a signal being determine by an amount of overlap of the first striplines 34 and the second striplines 36, a width of the second striplines 36 being at least partially tapered along a portion of the second striplines 36.

According to this aspect, in some embodiments, the sliding dielectric 30 has a first ground plane 40 on at least part of one side of the sliding dielectric and has the second striplines 36 on an opposite side of the sliding dielectric 30 facing the fixed dielectric 28, and wherein the sliding dielectric 30 further comprises vias 32 extending from the one side to the opposite side of the sliding dielectric 30, the vias 32 encompassing at least a portion of a perimeter surrounding the first and second striplines 34, 36. In some embodiments, the sliding phase shifter 26 further includes a second ground plane 42 below at least a portion of the second striplines 36, a separation between the first ground plane 40 and the second ground plane 42 being selected to achieve an impedance of the second striplines 36 that matches an impedance of the first striplines 34. In some embodiments, the second ground plane 42 is limited in extent so as to expose at least a portion of the first striplines 34 to the first ground plane 40. In some embodiments, the separation is selected so that a return loss is below a threshold for all positions of the sliding dielectric 30 within a frequency band of operation. In some embodiments, the sliding phase shifter 26 further includes a ground coupling strip 38 along the perimeter, the ground coupling strip 38 terminating one end of the vias 32. In some embodiments, the second striplines 36 are narrower than the first striplines 34. In some embodiments, the taper is selected to achieve an insertion loss that is above a threshold for all positions of the sliding dielectric 30 within a frequency band of operation. In some embodiments, the first striplines 34 are at least partially tapered in width along a direction of signal propagation of the first striplines 34. In some embodiments, the taper is linear.

According to another aspect, a sliding phase shifter 58 includes a fixed dielectric structure 64 having first striplines 66. The sliding phase shifter 58 also includes a sliding dielectric structure 60. The sliding phase shifter 58 is configured to provide a change in phase of a signal when the sliding dielectric structure 60 slides over the first striplines (66) to change an amount of overlap of the sliding dielectric and the first striplines. The sliding dielectric structure 60 has a first region with a first ground plane 62 above a level of the first striplines 66 and having a second region with a dielectric slab 61 above the level of the first striplines 66 and below a second ground plane 40.

According to this aspect, in some embodiments, the first striplines 66 follow a curved path. In some embodiments, the curved path is sinusoidal. In some embodiments, the first ground plane 62 is separated from the first striplines 66 by air. In some embodiments, the dielectric slab 61 is configured to cover an entire length of the first striplines 66 in a minimum delay position. In some embodiments, a dielectric constant of the dielectric slab 61 is higher than a dielectric constant of a dielectric of the fixed dielectric structure 64. In some embodiments, the fixed dielectric structure 64 has a third ground plane 72 below the first striplines 66 and a signal trace in a same plane as the third ground plane 72, the signal trace being coupled to the first striplines 66 by a via 74. In some embodiments, a height of the first ground plane 62, a height of the second ground plane 40 and a height of the third ground plane 72 are selected to provide an insertion loss that exceeds a threshold in a frequency band of operation. In some embodiments, a height of the first ground plane 62, a height of the second ground plane 40 and a height of the third ground plane 72 are selected to provide a return loss that falls below a threshold in a frequency band of operation. In some embodiments, the second ground plane 40 is above the first region and the second region, a ground coupling strip around a perimeter of the sliding dielectric structure and a plurality of vias around the perimeter, the vias extending from the ground coupling strip to the second ground plane 40.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A sliding phase shifter, comprising:

a fixed dielectric having first striplines to couple power into the sliding phase shifter; and a sliding dielectric having second striplines electrically slidingly coupled to the first striplines, an amount of phase shift or delay of a signal being determine by an amount of overlap of the first striplines and the second striplines, the sliding dielectric having a first ground plane on at least part of one side of the sliding dielectric and having the second striplines on an opposite side of the sliding dielectric facing the fixed dielectric, and the sliding dielectric further comprising vias extending from the one side to the opposite side of the sliding dielectric, the vias encompassing at least a portion of a perimeter surrounding the first and second striplines.

2. The sliding phase shifter of claim 1, wherein the width of the second striplines is narrower than a width of the first striplines.

3. The sliding phase shifter of claim 1, further comprising a second ground plane below at least a portion of the second striplines, a separation between the first ground plane and the second ground plane being selected to achieve an impedance of the second striplines that matches an impedance of the first striplines.

4. The sliding phase shifter of claim 3, wherein the second ground plane is limited in extent so as to expose at least a portion of the first striplines to the first ground plane.

5. The sliding phase shifter of claim 3, wherein the separation is selected so that a return loss is below a threshold for all positions of the sliding dielectric within a frequency band of operation.

6. The sliding phase shifter of claim 1, further comprising a ground coupling strip along the perimeter surrounding the first and second striplines, the ground coupling strip terminating one end of the vias.

7. A sliding phase shifter, comprising:

a fixed dielectric structure having first striplines; and a sliding dielectric structure, the sliding phase shifter configured to provide a change in phase of a signal when the sliding dielectric structure slides over the first striplines to change an amount of overlap of the sliding dielectric and the first striplines, the sliding dielectric structure having a first region with a first ground plane above a level of the first striplines and having a second region with a dielectric slab above the level of the first striplines and below a second ground plane, the sliding dielectric having the first ground plane on at least part of one side of the sliding dielectric and having the second striplines on an opposite side of the sliding dielectric facing the fixed dielectric, and the sliding dielectric further comprising vias extending from the one side to the opposite side of the sliding dielectric, the vias encompassing at least a portion of a perimeter surrounding the first and second striplines.

8. The sliding phase shifter of claim 7, wherein the fixed dielectric structure has a third ground plane below the first striplines and a signal trace in a same plane as the third ground plane, the signal trace being coupled to the first striplines by a via.

9. The sliding phase shifter of claim 8, wherein a height of the first ground plane, a height of the second ground plane and a height of the third ground plane are selected to provide a return loss that falls below a threshold in a frequency band of operation.

10. The sliding phase shifter of claim 8, wherein a height of the first ground plane, a height of the second ground plane and a height of the third ground plane are selected to provide an insertion loss that exceeds a threshold in a frequency band of operation.

11. The sliding phase shifter of claim 7, wherein the second ground plane is above the first region and the second region, a ground coupling strip around a perimeter of the sliding dielectric structure and a plurality of the vias around the perimeter, the vias extending from the ground coupling strip to the second ground plane.

12. The sliding phase shifter of claim 7, wherein the first striplines follow a non-linear path.

13. The sliding phase shifter of claim 12, wherein a least a portion of the non-linear path is sinusoidal.

14. The sliding phase shifter of claim 7, wherein the first ground plane is separated from the first striplines by air.

15. The sliding phase shifter of claim 7, wherein the dielectric slab is configured to cover an entire length of the first striplines in a maximum delay position.

16. The sliding phase shifter of claim 15, wherein a dielectric constant of the dielectric slab is higher than a dielectric constant of a dielectric of the fixed dielectric structure.

* * * * *